United States Patent [19]

Ohno

[11] 4,429,261

[45] Jan. 31, 1984

[54] APPARATUS FOR CONTROLLING THE TENSION OF A CASSETTE TAPE

[75] Inventor: Hirotoshi Ohno, Yokohama, Japan

[73] Assignee: Victor Company of Japan, Limited, Yokohama, Japan

[21] Appl. No.: 327,673

[22] Filed: Dec. 4, 1981

[30] Foreign Application Priority Data

Dec. 6, 1980 [JP] Japan .............................. 55-172498
Jan. 19, 1981 [JP] Japan .................................. 56-6175

[51] Int. Cl.³ .......................................... B65H 59/38
[52] U.S. Cl. .......................................... 318/6; 318/7; 242/190; 360/55
[58] Field of Search ................... 318/6, 7; 242/54 R, 242/55, 189, 190; 360/55, 74.3

[56] References Cited

U.S. PATENT DOCUMENTS

| 4,126,817 | 11/1978 | Luzio | 318/7 |
| 4,309,728 | 1/1982 | Takizawa et al. | 360/74.3 |
| 4,341,363 | 7/1982 | Inatome | 318/7 |
| 4,361,787 | 11/1982 | Negishi et al. | 318/7 |

*Primary Examiner*—J. V. Truhe
*Assistant Examiner*—A. Evans
*Attorney, Agent, or Firm*—Lowe, King, Price & Becker

[57] ABSTRACT

A tape tension sensor is provided to produce an electrical signal indicative of the tension of the running tape of a compact cassette in a tape recorder, and this signal is processed to derive a high frequency component representing the variation in tape velocity. A tape-contactable member is driven by a control signal which is produced on the basis of the high frequency component. In a first embodiment, the tape-contactable member is electromagnetically operated by the control signal so that the member damps or absorbs the vibrations of the tape in the vicinity of the record/reproduce head. A low frequency component may also be derived from the sensor output to produce a second control signal. In the first embodiment, the second control signal is fed to a payoff reel drive motor so that the rotational speed of the payoff reel is controlled to maintain the tension of the tape constant. In a second embodiment, the high frequency component and the low frequency component are added to each other to produce a single control signal which is fed to a motor for driving an upstream capstan of a dual-capstan type tape recorder.

10 Claims, 6 Drawing Figures

APPARATUS FOR CONTROLLING THE TENSION OF A CASSETTE TAPE

BACKGROUND OF THE INVENTION

This invention relates generally to the tape driving mechanism of a tape recorder for use with a cassette tape, and more particularly, the present invention relates to apparatus for controlling the tension applied to the magnetic recording tape supplied from a tape cassette.

In order that recording and reproducing are effected in a tape recorder with high fidelity, the magnetic recording tape should be in contact with the record/reproduce head or heads in a satisfactory manner. To this end, it is necessary that the tension of the tape is always constant. In a conventional tape driving mechanism of a so called open-reel tape recorder, the mechanical accuracy of various elements in the tape running system is made high or tape tension control device having a mechanical or electrical means is provided so that the running tape exhibits a constant tension all the time.

However, in a tape recorder for use with a compact cassette (trademark), the above-mentioned countermeasures, which have been taken against open-reel tapes, have not been adapted because the way of applying tension is basically different from that of the open-reel type recorders. In a compact cassette, the magnetic tape is guided by guide pins and guide rollers which are made of a synthetic resin and are provided in a narrow casing of the compact cassette. The mechanical accuracy of various elements constituting a part of the tape running system is relatively low when compared with that of the open-reel tape recorders.

In the conventional cassette tape recorders, the tape tension is mainly given by the driving force of the capstan and by the frictional force produced by the slipping of the reel mount of the payoff (supply) reel. Therefore, it is difficult to maintain the tape tension constant. As a result, the tape is apt to vibrate in its longitudinal direction, in the vicinity of the record/reproduce head, causing the occurrence of modulation noise and dropout in the recording or reproducing signal.

Some conventional cassette tape recorders have two capstans positioned upstream and downstream of the record/reproduce head. In such a dual-capstan tape recorder, the rotational speeds of the two capstans are selected so that the rotational speed of the upstream capstan is a little lower than that of the downstream capstan. Namely, tape tension is applied by the slipping friction between the tape and the upstream capstan, which slipping occurs by the difference in rotational speeds between the two capstans. However, such a dual-capstan type tape recorder has suffered from a problem that the speed difference is apt to deviate from a desired value due to secular change. Furthermore, since the tape tension is controlled by the slipping between the capstan and the magnetic tape, the frictional coefficient is apt to change in accordance with the sort of the tape and variation in ambient temperature and humidity, causing the tape tension value to deviate from its optimal value.

SUMMARY OF THE INVENTION

The present invention has been achieved in order to remove the above-mentioned various disadvantages and drawbacks inherent to the tape driving mechanism of the conventional cassette tape recorder.

It is, therefore, an object of the present invention to provide apparatus for controlling the tension of a cassette tape so that recording and reproducing can be stably and accurately performed.

According to a feature of the present invention, the tape tension is detected by means of a tape tension sensor, and the detected tape tension will be processed to produce at least one control signal. The control signal is then applied to a control device which gives suitable tension to the tape or damps the vibrations of the tape.

In accordance with the present invention, there is provided apparatus for controlling the tension of a cassette tape in a tape recorder, comprising: first means for detecting the tension of the tape in the vicinity of the record/reproduce head of said tape recorder; second means responsive to the output signal from said first means for producing a control signal by detecting a high frequency component of said output signal; and third means for absorbing the vibrations of said tape in the vicinity of said first means in accordance with said control signal, said third means having a member which is contactable with said tape, the motion of the contactable member being controlled by said high frequency component.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like numerals throughout the drawings.

DETAILED DESCRIPTION OF THE INVENTION

Prior to describing the preferred embodiments of the present invention, the aforementioned drawbacks inherent to the conventional cassette tape recorders will be discussed for better understanding of the present invention.

Figure 1:
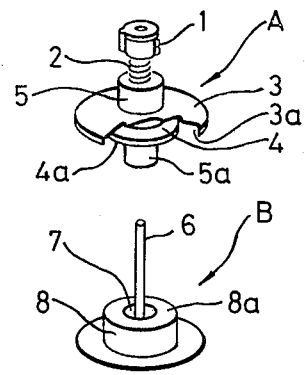
FIG. 1 is an exploded perspective view of a payoff reel mount of a cassette tape recorder.

FIG. 1 is an exploded perspective view of a payoff reel mount of a cassette tape recorder. In FIG. 1, the reference A is a rotary portion; and B, a stationary portion. The stationray portion B has an annular member 8 having a slipping surface 8a at its upper portion, and this annular member 8 is fixed to a center shaft 6 coaxially. The annular member 8 is made of a metal or a synthetic resin.

In the rotary portion A, the reference 1 is a cylindrical pawl portion having a plurality of teeth for being engaged with the cassette hub; 2, a spring; 3, a disk; 4, an annular felt sheet attached to the lower surface 3a of the disk 3 by an adhesive; and 5, a shaft fixed to the disk 3. The lower portion 5a of the shaft 5 is arranged to be telescopically and rotatably engaged with a cylindrical hole 7 of the stationary portion B, while the center shaft 6 is inserted into the center hole (not shown) of the shaft 5.

The pawl portion 1 for receiving the cassette hub is coaxial with the shaft 5, and co-operates with the shaft 5 in the rotating direction. Moreover, the pawl portion 1 is movable upward and downward because of the provision of the spring 2 interposed between the top end of the shaft 5 and the lower end of the pawl portion 1. Therefore, when the hub of a compact cassette is engaged with the pawl portion 1, the pawl portion 1 moves up and down for making the engagement easy.

The lower surface 4a of the annular felt sheet 4 is in contact with the upper surface of the annular member 8 when the rotary portion A is engaged with the stationary portion B. Therefore, a torque caused by the friction between the slipping surface 8a and the lower surface 4a of the annular felt sheet 4 occurs in the shaft 5 when the payoff reel mount rotates, where the degree of the torque is defined by the frictional factors of the contacting members. The torque generated by the payoff reel mount gives back tension to the magnetic tape supplied from the payoff reel.

The friction coefficient between the slipping surface 8a and the lower surface 4a of the felt 4 changes in accordance with the ambient temperature and humidity, resulting in change in the torque caused by the frictional force. In addition, since the rotational speed of the reel mount chages in accordance with the radius of the wound tape, the degree of the torque caused by the frictional force between the slipping surface 8a and the lower surface 4a of the felt sheet 4 varies in accordance with the radius of the wound tape.

The value of the back tension applied by the reel mount to the tape equals the degree of the torque divided by the wound tape diameter, which torque is generated by the frictional force. On the other hand another tension given by the pinch roller and the capstan is constant, and therefore, in order that the tension of the running tape is constant, it is necessary that the degree of the back tension given by the reel mount is always constant irrespective of the wound tape diameter.

In order that the degree of the back tension applied by the reel mount to the tape is constant irrespective of the wound tape diameter, the degree of the torque by the frictional force in the reel mount has to be proportional to the wound tape diameter. However, when the wound tape radius becomes small, the rotational speed of the reel shaft becomes high, resulting in increase in the relative velocity of the felt sheet 4 to the slipping surface 8a. As a result, with the slipping friction by the felt sheet 4, the torque generated by the frictional force occurring between the lower surface 4a of the felt 4 and the slipping surface 8a becomes great when the wound tape radius becomes small. Therefore, the back tension given to the tape becomes excessively great. On the other hand, when the wound tape radius is great, phenomena opposite to the above will occur. Namely, with the reel mount having the structure of FIG. 1 the degree of the back tension given to the tape varies as a function of the wound tape diameter, and therefore, it is impossible to set the tension of the running tape constant.

Apart from the structure of the reel mount in a cassette tape recorder, let us pay attention to the tape running system in a compact cassette. In the compact cassette, plastic molds of the casing thereof are used for guide pins and guide rollers where the finishing accuracy of these members is relatively low compared to the high finishing accuracy of metal-made members used in open-reel tape recorders. Therefore, the running tape is apt to vibrate in its longitudinal direction due to sliding friction at the guide pin and the guide roller disposed beween the payoff reel and the capstan. Such vibrations will result in the occurrence of modulation and/or dropout in the recording/reproducing signal, and this problem cannot be resolved by the application of the back tension generated by the friction in the payoff reel mount having an annular felt sheet.

Figure 2:
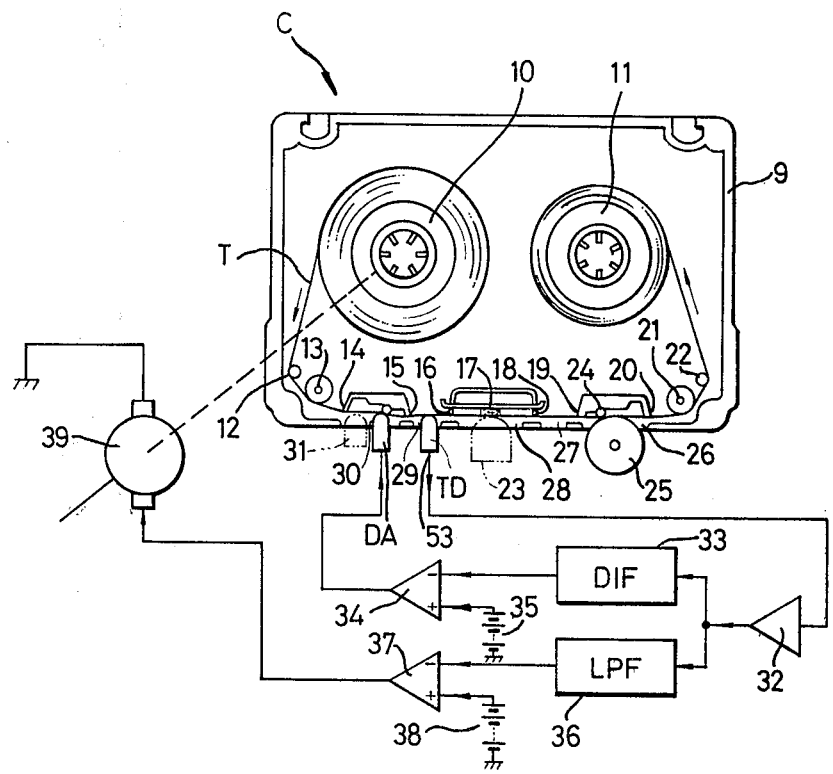
FIG. 2 is a schematic diagram of a first embodiment of the apparatus for controlling the tension of a cassette tape according to the present invention.

Reference is now made to FIG. 2 which shows a schematic diagram of an embodiment of the present invention. The apparatus for controlling the tension of the running magnetic tape of a compact cassette will be incorporated into a cassette tape recorder or a player having a tape driving mechanism, record/reproduce head, erase head, signal processing circuits etc.

A compact cassette C is shown with its upper casing removed so that the tape running system thereof can be seen. The reference 9 indicates the lower casing of the compact cassette C having a payoff reel 10 and a take-up reel 11 both having a form of a hub. The magnetic tape T of the compact cassette C is wound around the hubs 10 and 11 from its both ends, and is arranged to run along a given running path determined by a first guide pin 12, a first guide roller 13, tape guides 14, 15 and 16, a pad 17, tape guides 18, 19 and 20, a second guide roller 21, and a second guide pin 22. The compact cassette casing has small windows at its front end, i.e. the lower edge of the cassette C of FIG. 2, so that the tape T is capable of being in contact with the pinch roller 25, the record/reproduce head 23, and the erase head 31 of the tape recorder (not shown). The reference 24 is the capstan of the tape recorder, which capstan is inserted in a through-hole of the compact cassette C. The magnetic tape T is driven by the capstan 24 which rotates at a constant speed, where the magnetic tape T is pressed between the capstan 24 and the pinch roller 25. The record/reproduce head 23 and the erase head 31 are both shown by way of dotted lines. The take-up reel 11 and the payoff reel 10 are respectively driven by motors. The above-described structure is the same as in the conventional tape recorders.

In the first embodiment apparatus according to the present invention, a tape tension sensor TD is provided for detecting the tension of the running tape in the vicinity of the record/reproduce head 23. A tip portion of the tape tension sensor TD is inserted through one window 29 into the cassette C so as to be in contact with the running tape T. The tape tension sensor TD produces an electrical signal indicative of the tension, and the structure and operation of the tape tension sensor TD will be described in detail with reference to FIG. 3 later.

A vibration absorbing device or damping device DA is arranged to absorb the vibrations of the tape T in accordance with a control signal generated by electrical circuitry which processes the output signal of the tape tension sensor TD. A tip portion of the vibration absorbing device DA is also inserted through the window 30 of the cassette C to be in contact with the running tape T at a point upstream the tape tension sensor TD.

The structure and operation of the vibration absorbing device DA will also be described with reference to FIG. 4 later.

The reference numeral 39 indicates a driving motor which drives the payoff reel 10 via its mount (not shown). This motor 39 is controlled by another control signal from the electrical circuitry. The structure and operation of the electrical circuitry will be described later.

Figure 3:
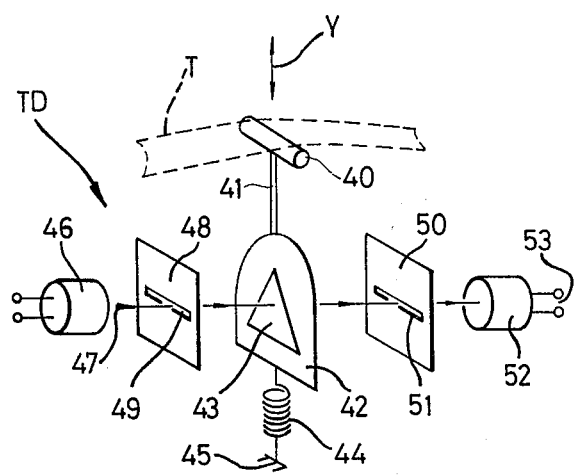
FIG. 3 is a schematic perspective view showing the structure of the tape tension sensor shown in FIG. 2.

Reference is now made to FIG. 3 which is a schematic perspective view of the tape tension sensor TD. The sensor TD comprises a sensor head 40 arranged to be in contact with the running tape T shown by way of dotted lines. The sensor head 40 is connected via a supporting rod 41 to one end of a slit plate 42 having a triangular slit 43. The other end of the slit plate 42 is connected by an elastic member 44, such as a spring or rubber block, to a stationary member 45. The sensor head 40, the supporting rod 41, the slit plate 42, and the elastic member 44, which functions as a center supporting element, constitute a movable portion of the sensor TD, and this movable portion is just like a spring scale because it moves up and down in the drawing in receipt of vibrations from the tape T. When the sensor head 40 is in contact with the running tape T, the movable portion of the sensor TD moves in the directions of an arrow Y in accordance with the degree of the tape tension.

A light-emitting element 46, such as a light-emitting diode, is provided at one side of the slit plate 42, while a light-receiving element 52, such as a photo transistor, is provided at the other side. Second and third slit plates 48 and 50 are respectively interposed between the light-emitting element 46 and the first mentioned movable slit plate 42, and between the light-receiving element 52 and the movable slit plate 42. The light-emitting element 46, the light-receiving element 52 and the second and third slit plates 48 and 50 are all stationary.

The tape tension sensor TD operates as follows. Since the sensor head 40 is in contact with the tape T, the movable portion of the sensor TD moves in the directions of the arrow Y in accordance with the variation in tape tension. A light ray 47 emitted from the light-emitting element 46 propagates through the slit 49 of the second slit plate 48, the triangular slit 43 of the movable slit plate 42, and the slit 51 of the third slit plate 50 to the light-receiving element 52. As the triangular slit 43 of the movable slit plate 42 moves in the directions of the arrow Y, the amount of light received by the light-receiving element 52 varies. In other words, the amount of light blocked by the movable slit plate 42 varies as the movable portion moves, namely as a function of the displacement of the tape T. As a result, the light-receiving element 52 produces an output electrical signal indicative of the tension of the running tape T. The stiffness of the center supporting element (elastic member) 44 as well as the mass of the movable portion is determined so that the resonance frequency of the movable portion is higher than the highest frequency of the tape tension variation intended to be controlled.

Although the tape tension sensor of FIG. 3 is arranged to detect the tape tension by optically measuring the same, various modifications may be made. For instance, the tape tension may be detected by using the variation in reluctance or principle of a strain gauge. Namely, any type of tension sensor may be used as long as the sensor produces an output electrical signal indicative of the running tape tension.

The output signal of the tape tension sensor TD, i.e. the output signal from the light-receiving element 52, is applied to the above-mentioned electrical signal processing circuitry of FIG. 2.

Turning back to FIG. 2, the electrical signal processing circuitry comprises an amplifier 32, a differentiating circuit 33, a low pass filter 36, first and second differential amplifiers 34 and 37, and first and second reference voltage sources 35 and 38. The output terminal 53 of the light-receiving element 52 is connected to the input terminal of the amplifier 32, the output terminal of which is respectively connected to the input terminals of the differentiating circuit 33 and the low pass filter 36. The output terminal of the differentiating circuit 33 is connected to the inverting input terminal (−) of the first differential amplifier 34 having a noninverting input terminal (+) connected to the first reference voltage source 35. The output terminal of the low pass filter 36 is connected to the inverting input terminal (−) of the second differential amplifier 37 having a noninverting input terminal (+) connected to the second reference voltage source 38. The output terminal of the first differential amplifier 34 is connected to the vibration absorbing device DA, which will be simply referred to as a damper, while the output terminal of the second differential amplifier 37 is connected to the payoff reel drive motor 39. Namely, the output signals of the first and second differential amplifiers 34 and 37 are used as control signals for these actuating devices DA and 39.

The electrical signal processing circuitry of FIG. 2 operates as follows. The output signal from the tape tension sensor TD is first amplified by the amplifier 32, and then the amplified signal is fed to the differentiating circuit 33 and the low pass filter 36. The differentiating circuit 33 produces its output signal which represents the variation in tape velocity caused by the vibrations of the tape T because the output signal of the sensor TD indicative of the tape displacement has been differentiated. The differentiated output signal from the differentiating circuit 33 is then fed to the first differential amplifier 34 in which the voltage difference between the differentiated signal and the reference voltage from the first voltage source 35 is produced. The damper DA is then controlled by the output signal from the first differential amplifier 34 so as to absorb the vibrations of the tape T.

On the other hand, the low pass filter 36 responsive to the output signal from the amplifier 32 supplies the second differential amplifier 37 with the low frequency component of the output signal from the tape tension sensor TD. The second differential amplifier 37 operates in the same manner as the first differential amplifier 34 by using the second reference voltage from the second voltage source 38. The output signal of the second differential amplifier 37 is then fed to the payoff reel drive motor 39 as a driving current so that the torque generated by the motor 39 will be controlled to adjust the tension of the tape T. In the case that the drive motor 39 is directly driven by the output signal of the second differential amplifier 37 as in the illustrated embodiment, an operational amplifier capable of functioning as a driver is used as the second differential amplifier 37. Furthermore, a suitable switching circuit (not shown) may be provided for controlling the ON-OFF operation of the drive motor 39. On the other hand, in the case that the first embodiment apparatus is additionaly provided to a conventional tape recorder, the output signal of the second differential amplifier 37 may be added to a driving current separately applied to the payoff reel drive motor 39 from a drive circuit inherent to the tape recorder. The differentiating circuit 33 may be substituted with a high pass filter having flat responsive curve in a high frequency range.

From the above it will be understood that the first embodiment apparatus accoding to the present invention constitutes two closed loops or negative feedback loops; one including the diffentiating circuit 33, the first differential amplifier 34 and the damper DA; and the other including the low pass filter 36, the second differential amplifier 37 and the payoff reel drive motor 39.

The first and second reference voltages may be respectively selected in view of the intentional degrees of vibrations and tension of the tape T to be controlled. Furthermore, the gains of the first and second differential amplifiers 34 and 37 may be separately set to desired values. In addition to the arrangement of FIG. 2, each of the damper DA and the payoff reel drive motor 39 may be equipped with a motional feedback structure so that the moving or rotating speed thereof is controlled in accordance with detected speed, for preventing overspeed.

Figure 4:
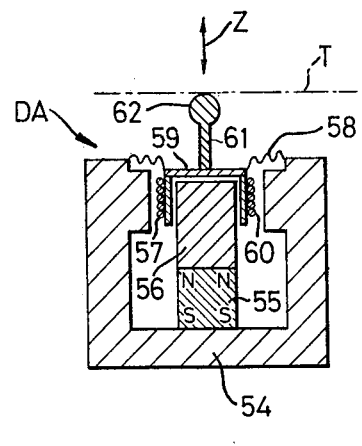
FIG. 4 is a cross-sectional view of the damping device shown in FIG. 2.

Reference is now made to FIG. 4 which shows the structure of the damper DA by way of its cross-sectional view. The damper DA comprises a yoke 54, a permanent magnet 55, a center pole 56 all constituting a magnetic circuit. The damper DA further comprises a bobbin 59, a coil 60 wound around the bobbin 59, a bobbin supporter 58, and a braking element 62 connected via a supporting member 61 to the front end of the bobbin 59. The bobbin 59 is inserted in an annular gap 57 defined between the periphery of the center pole 56 and the both ends of the yoke 54 so as to be movable in the directions of an arrow Z. The bobbin 59 is resiliently supported by the the bobbin supporter 58 which is secured to the yoke 54. The braking element 62 has a cylindrical or columnar shape and is arranged to move together with the bobbin 59. The coil 60 wound around the bobbin 59 is supplied with the output signal of the first differential amplifier 34 of FIG. 2.

When the output signal from the first differential amplifier 34 is fed to the coil 60, the bobbin 59 moves in the directions of the arrow Z, and thus the braking element 62 is driven in the same directions accordingly. As a result, the vibrations of the running tape T is damped or absorbed by the braking element 62 of the damper DA. It is to be noticed that this damping or vibration-absorbing effect is achieved because the phase of the output signal of the tape tension sensor TD in inverted by the first differential amplifier 34 so as to perform a negative feedback operation.

Similarly, the output signal of the tape tension sensor TD is inverted by the second differential amplifier 37 so as to perform another negative feedback control by the payoff reel drive motor 39. In other words, when the degree of tape tension is small, higher backward torque is generated by the payoff reel drive motor 39 so that suitable tension is given to the running tape T.

The damper DA is capable of damping the vibrations of the running tape T because it responds to the high frequency component of the output signal from the tape tension sensor TD without time delay. Since the damper DA is disposed close to the tape tension sensor TD which is provided in the vicinity of the record/reproduce head 23, the vibrations of the running tape T around the record/reproduce head 23 can be effectively reduced.

Furthermore, only the low frequency component of the output signal from the tape tension sensor TD is fed back stably to the payoff reel 10 having great momemt of inertia so that the payoff reel drive motor used for driving the payoff reel shaft and having great torque is driven by the low frequency component without being disturbed by the high frequency component. As a result, the tension of the tape T is maintained constant. Although it has been described that the vibrations of the tape T in the longitudinal direction, i.e. the direction of tape running, are effectively damped by the damper DA, vibrations in the transverse direction, i.e. a direction of the tape width, can also be reduced by the provision of the sensor head 40 of the tape tension sensor TD and the braking element 62 of the damper DA.

Although the first embodiment has been described that two negative feedback loops are formed to damp or absorb the tape vibrations and to maintain the tape tension constant, these two negative feedback loops are not necessary combined. Namely, one of these two feedback loops may be selectively used if desired.

The above-described first embodiment is directed to a cassette tape recorder having a single capstan since most cassette tape recorders on market are of single-capstan type. Dual-capstan type cassette tape recorders are sometimes used in the same manner as in open-reel recorders when it is intended to accurately control the running condition of a magnetic tape. However, the dual-capstan type tape recorders has suffered from the deviation in the rotational speed difference between its two capstans as described at the beginning of this specification. Prior to describing the second embodiment of the present invention directed to a duel-capstan cassette tape recorder, the conventional dual-capstan cassette tape recorder will be described for better understanding of the second embodiment.

Figure 5:
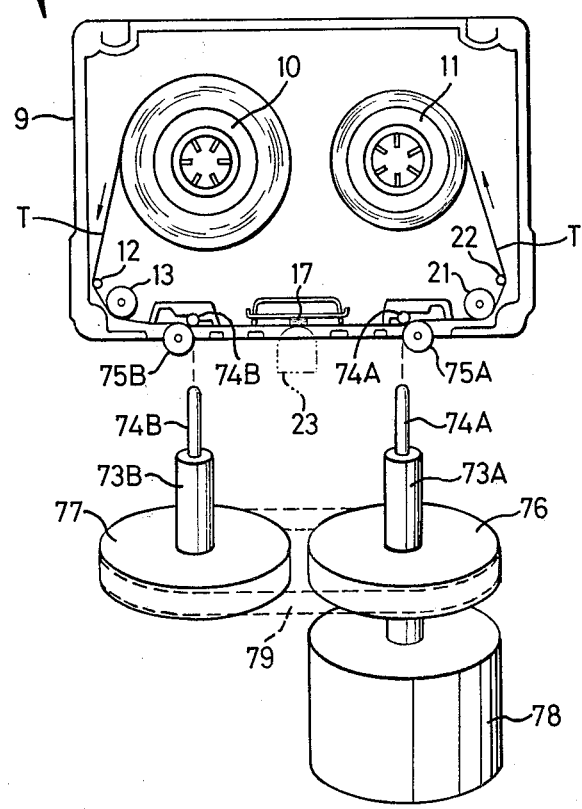
FIG. 5 is an explanatory view showing the conventional dual-capstan type cassette tape recorder.

Reference is now made to FIG. 5 showing the relationship between a cassette and the capstan drive mechanism of the conventional dual-capstan type tape recorder. The structure of the cassette C is the same as in FIG. 2, and therefore, description thereof is omitted.

The two capstans are respectively designated at 74A and 74B, and these capstans 74A and 74B are respectively arranged to face corresponding pinch rollers 75A and 75B so as to sandwich the tape T therebetween. The capstan 74B is positioned upstream of the record/reproduce head 23, while the other capstan 74A is positioned downstream of the same. The downstream capstan 74A is a part of the shaft 73A of a capstan drive motor 78. The shaft 73A has a pulley 76 coaxially attached thereto, and the pulley 76 is coupled via a belt 79 to another pulley 77 which is coaxially attached to the upstream capstan 74B by a shaft 73B. These two pulleys 76 and 77 also function as flywheels and are positioned so that their axes are parallel to each other, and the diameters of the pulleys 76 and 77 are equal to each other.

The rotational speed of the capstan drive motor 78 is selected so that the running velocity of the tape T equals a predetermined value. The belt 79 is made of rubber, and the rotational speed of the upstream capstan 74B is selected to a value which is 0.1 to 0.2 percent smaller than that of the downstream capstan 74A by using the elasticity of the rubber made belt 79. With this provision, the downstream capstan 74B rotates at a speed which is a little lower than that of the upstream capstan 74A. As a result, slipping occurs between the upstream capstan 74B and the magnetic tape T. This slipping friction results in the occurrence of tape tension.

As described at the beginning of this specification, the rubber made belt 79 is apt to be deteriorated during long time use or the characteristics of the belt 79 is apt to change due to variation in temperature and/or humidity, causing the rotational speed difference to deviate from a predetermined value. Furthermore, the friction coefficient between the magnetic tape T and the capstans 74A and 74B is apt to change in accordance with the ambient temperature and/or humidity.

Figure 6:
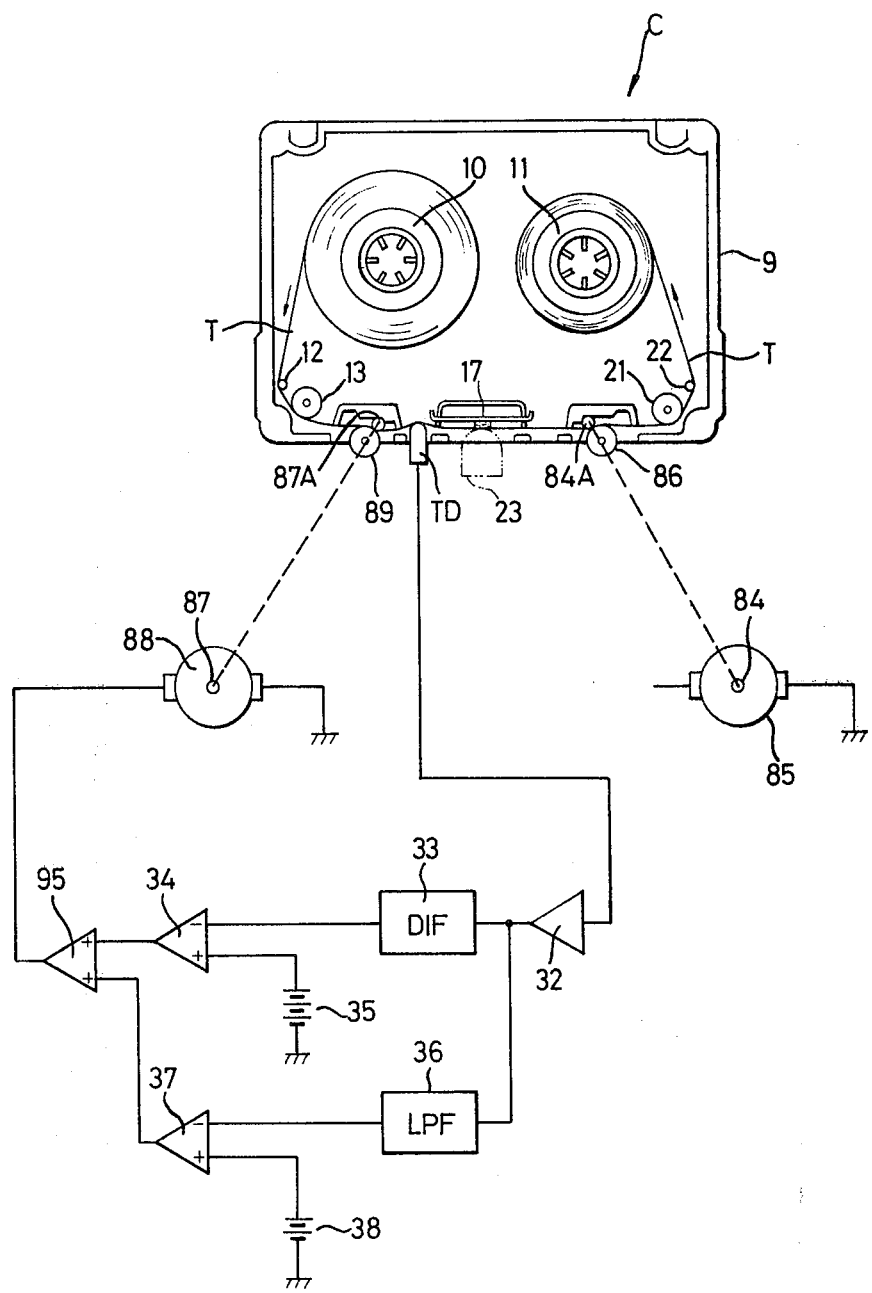
FIG. 6 is a schematic diagram of a second embodiment of the apparatus for controlling the tension of a cassette tape according to the present invention.

The second embodiment of the present invention, which will be described hereafter, is adapted to a dual-capstan type tape recorder for removing the above-mentioned defects. Referring now to FIG. 6 showing a schematic diagram of the second embodiment, an upstream capstan 87A and a downstream capstan 84A are shown to be inserted in through-holes of the cassette C. The cassette C per se is the same as in FIG. 2, and various elements thereof are designated at like numerals. The upstream and downstream capstans 87A and 84A respectively face their corresponding pinch rollers 89 and 86 in the same manner as in the conventional example of FIG. 5. The second embodiment apparatus is different from the conventional example in that both the capstans 87A and 84A are respectively driven by their drive motors 88 and 85. The references 87 and 84 indicate the shaft of the motors 88 and 85, and the upstream and downstream capstans 87A and 84A are respectively positioned at the tip portion of each shaft 87 or 84. In addition to the above, electrical signal processing circuitry similar to that of the first embodiment of FIG. 2 is provided. In detail, the tape tension sensor TD, which is identical with that of the first embodiment, is provided to pickup the tension information. The electrical signal processing circuitry responsive to the output signal from the tape tension sensor TD has the same structure as the electrical signal processing circuitry of FIG. 2 except that an amplifier 95 is additionally provided. The amplifier 95 is responsive to the output signals of the first and second differential amplifiers 34 and 37 so that these output signals are added to or superposed upon each other. Since the operation of the input amplifier 32, the differentiating circuit 33, the low pass filter 36 and the first and second differential amplifiers 34 and 37 is the same as in the first embodiment, the description of their operation is omitted.

The amplifier 95 produces an output signal as a result of the addition, so that the upstream capstan drive motor 88 is controlled in accordance with the added or superposed signal. Namely, the upstream capstan drive motor 88 is fed with a driving current from the final stage amplifier 95, where the driving current includes a high frequency component for effecting damping and a low frequency component for giving tension to the tape T. As a result, the rotational speed of the upstream capstan drive motor 88 is controlled by two factors; one having a high frequency component indicative of the tape velocity variation and the other having a low frequency component indicative of the tape tension variation. Since the upstream capstan 87A is positioned at the same point where the damper DA of the first embodiment is disposed, the vibrations of the tape T are effectively reduced, and the tension of the tape T is optimally controlled. In the second embodiment, since the tension of the tape T around the record/reproduce head 23, namely between the upstream and downstream capstans 87A and 84A, is accurately controlled, it is not required to control the payoff reel drive motor. If desired, motional feedback may be provided to the upstream capstan drive motor 88 so as to prevent overspeeding of the same.

From the above, it will be understood that the second embodiment can improve the running condition of the cassette tape by adapting it to a dual-capstan type tape recorder. Since there is no rubber belt coupling the two capstans, no problem in connection with secular change or temperature or humidity change. Furthermore, there is no fear of occurrence of mechanical resonance in the combination of the belt, the drive motor and the flywheels of the two capstans. In addition, since the tape tension is given by controlling the rotational speed of the upstream capstan drive motor 88 in the second embodiment without using slipping friction between the tape T and the upstream capstan 88, the tape tension can be kept constant irrespective of the physical properties of the magnetic tapes used.

Desired tape tension and vibration damping or absorbing amount can be respectively set by suitably selecting the reference voltages of the voltage sources 35 and 38 in the same manner as in the first embodiment. Although the electrical circuitry of FIG. 6 has two closed loops, these closed loops may be incorporated into a single loop. Namely, the combination of the differentiating circuit 33, the low pass filter 36, the first and second differential amplifiers 34 and 37 and the final stage amplifier 95 may be replaced with an equalizer responsive to the output signal from the amplifier 32, and a single differential amplifier responsive to the output signal from the equalizer. With this arrangement, the high frequency component and the low frequency component are not separated from each other, while their amplitudes are suitably adjusted by the equalizer.

From the foregoing description, it will be understood that the tension and the undesirable vibrations of the running cassette tape are effectively controlled by the negative feedback loop(s).

The above-described embodiments are just examples of the present invention, and therefore, it will be apparent for those skilled in the art that many modifications and variations may be made without departing from the spirit of the present invention.

What is claimed is:

1. Apparatus for controlling the tension of tape in a tape recorder cassette, comprising:
    (a) first means for producing an output signal indicative of the vibration in and tension of the tape in the vicinity of the record/reproduce magnetic head of said tape recorder, said first means having a sensor head positioned near said magnetic head to enable the sensor head to respond to vibration in as well as tension of the tape;
    (b) second means responsive to the output signal from said first means for producing a control signal by detecting a high frequency component of said output signal indicative of tape vibration;
    (c) third means for damping vibrations of said tape in the vicinity of said first means in accordance with said control signal, said third means having a member which is contactable with said tape, said member being movable in accordance with said detected high frequency component.

2. Apparatus as claimed in claim 1, further comprising a low pass filter responsive to said output signal from said first means, and a differential amplifier responsive to the output signal from said low pass filter for producing a second control signal, said second control signal being fed to a payoff reel drive motor of said tape recorder.

3. Apparatus as claimed in claim 1, wherein said sensor head of said first means is positioned so as to be inserted through a small window of a cassette to be in contact with said tape.

4. Apparatus as claimed in claim 1, wherein said third means is positioned upstream of said first means along said tape.

5. Apparatus for controlling the tension of tape in a tape recorder cassette, comprising:
   (a) first means for detecting the tension of the tape in the vicinity of the record/reproduce head of said tape recorder;
   (b) second means responsive to the output signal from said first means for producing a control signal by detecting a high frequency component of said output signal; and
   (c) third means for absorbing the vibrations of said tape in the vicinity of said first means in accordance with said control signal, said third means having a member which is contactable with said tape, the motion of the contactable member being controlled by said high frequency component, wherein said first means comprises a movable portion having a sensor head which is contactable with said tape, and means for detecting the displacement of said movable portion.

6. Apparatus for controlling the tension of tape in a tape recorder cassette, comprising:
   (a) first means for detecting the tension of the tape in the vicinity of the record/reproduce head of said tape recorder;
   (b) second means responsive to the output signal from said first means for producing a control signal by detecting a high frequency component of said output signal; and
   (c) third means for absorbing the vibrations of said tape in the vicinity of said first means in accordance with said control signal, said third means having a member which is contactable with said tape, the motion of the contactable member being controlled by said high frequency component, wherein said second means comprises a differentiating circuit responsive to said output signal from said first means, and a differential amplifier responsive to the output signal from said differentiating circuit for producing said control signal.

7. Apparatus for controlling the tension of tape in a tape recorder cassette, comprising:
   (a) first means for detecting the tension of the tape in the vicinity of the record/reproduce head of said tape recorder;
   (b) second means responsive to the output signal from said first means for producing a control signal by detecting a high frequency component of said output signal; and
   (c) third means for absorbing the vibrations of said tape in the vicinity of said first means in accordance with said control signal, said third means having a member which is contactable with said tape, the motion of the contactable member being controlled by said high frequency component, wherein said third means comprises an electromagnetically operable device having said tape-contactable member which is movable in a direction normal to said tape.

8. Apparatus as claimed in claim 7, wherein said tape-contactable member of said third means is positioned so as to be inserted through a small window of a cassette to be in contact with said tape.

9. Apparatus for controlling the tension of tape in a tape recorder cassette, comprising:
   (a) first means for detecting the tension of the tape in the vicinity of the record/reproduce head of said tape recorder;
   (b) second means for responsive to the output signal from said first means for producing a control signal by detecting a high frequency component of said output signal; and
   (c) third means for absorbing the vibrations of said tape in the vicinity of said first means in accordance with said control signal, said third means having a member which is contactable with said tape, the motion of the contactable member being controlled by said high frequency component, wherein said third means comprises a drive motor for driving an upstream capstan provided in addition to a downstream capstan which is separately driven.

10. Apparatus as claimed in claim 9, wherein said second means comprises a differentiating circuit responsive to said output signal from said first means; a first differential amplifier responsive to the output signal from said differentiating circuit; a low pass filter responsive to said output signal from said first means; a second differential amplifier responsive to the output signal from said low pass filter; and an adder for adding the output signals of said first and second differential amplifiers to each other for producing said control signal.

* * * * *